United States Patent [19]

Nakajima

[11] Patent Number: 5,502,574

[45] Date of Patent: Mar. 26, 1996

[54] FACSIMILE APPARATUS WHICH CAN AVOID UNWANTED INTERLINE BREAKS IN OUTPUT

[75] Inventor: Toshifumi Nakajima, Tokyo, Japan

[73] Assignee: Canon Kabushiki Kaisha, Tokyo, Japan

[21] Appl. No.: 364,511

[22] Filed: Dec. 27, 1994

Related U.S. Application Data

[63] Continuation of Ser. No. 113,314, Aug. 30, 1993, abandoned, which is a continuation of Ser. No. 820,023, Jan. 13, 1992, abandoned, which is a continuation of Ser. No. 430,175, Nov. 1, 1989, abandoned.

[30] Foreign Application Priority Data

Nov. 4, 1988 [JP] Japan .................................. 63-277481
Dec. 1, 1988 [JP] Japan .................................. 63-304670

[51] Int. Cl.$^6$ ................................ H04N 1/00; H04N 1/40
[52] U.S. Cl. ......................... 358/400; 358/447; 358/448; 382/181; 382/254
[58] Field of Search ...................... 358/400, 401, 358/437, 443, 447, 448, 444; 382/9, 47, 173, 181, 254

[56] References Cited

U.S. PATENT DOCUMENTS

| | | | |
|---|---|---|---|
| 4,531,133 | 7/1985 | Leng | 358/437 |
| 4,654,873 | 3/1987 | Fujisawa et al. | 382/9 |
| 4,745,561 | 5/1988 | Hirosawa et al. | 340/735 |
| 4,791,491 | 12/1988 | Minowa | 358/443 |
| 4,901,249 | 2/1990 | Shiota | 364/519 |
| 4,910,607 | 3/1990 | Kita et al. | 358/448 |

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

In a facsimile apparatus which can be connected to a data processing apparatus for transmitting/receiving a digital signal, when a specific pattern which is to overlap two or more lines of print without a space between the lines is to be output, a pattern is developed so that the patterns in the upper and lower lines are made continuous with each other. When characters of various fonts are to be mixed, arbitrary patterns from another apparatus can be registered in the facsimile apparatus with arbitrary codes in addition to an output operation using patterns corresponding to codes registered in advance in the facsimile apparatus. For this reason, any codes can be output during an output operation of one page, and various patterns can be mixed.

6 Claims, 11 Drawing Sheets

FIG. 2

|  | 0000 | 0001 | 0010 | 0011 | 0100 | 0101 | 0110 | 0111 | 1000 | 1001 | 1010 | 1011 | 1100 | 1101 | 1110 | 1111 |
|---|---|---|---|---|---|---|---|---|---|---|---|---|---|---|---|---|
| 0000 | CG RAM (1) |  |   | 0 | @ | P | ` | p |  |  |   | 0 | @ | P | ` | p |
| 0001 | (2) |  | ! | 1 | A | Q | a | q |  |  | ! | 1 | A | Q | a | q |
| 0010 | (3) |  | " | 2 | B | R | b | r |  |  | " | 2 | B | R | b | r |
| 0011 | (4) |  | # | 3 | C | S | c | s |  |  | # | 3 | C | S | c | s |
| 0100 | (5) |  | $ | 4 | D | T | d | t |  |  | $ | 4 | D | T | d | t |
| 0101 | (6) |  | % | 5 | E | U | e | u |  |  | % | 5 | E | U | e | u |
| 0110 | (7) |  | & | 6 | F | V | f | v |  |  | & | 6 | F | V | f | v |
| 0111 | (8) |  | ' | 7 | G | W | g | w |  |  | ' | 7 | G | W | g | w |
| 1000 | (1) |  | ( | 8 | H | X | h | x |  |  | ( | 8 | H | X | h | x |
| 1001 | (2) |  | ) | 9 | I | Y | i | y |  |  | ) | 9 | I | Y | i | y |
| 1010 | (3) |  | * | : | J | Z | j | z |  |  | * | : | J | Z | j | z |
| 1011 | (4) |  | + | ; | K | [ | k | { |  |  | + | ; | K | [ | k | { |
| 1100 | (5) |  | , | < | L | ¥ | l | \| |  |  | , | < | L | ¥ | l | \| |
| 1101 | (6) |  | - | = | M | ] | m | } |  |  | - | = | M | ] | m | } |
| 1110 | (7) |  | . | > | N | ^ | n | → |  |  | . | > | N | ^ | n | → |
| 1111 | (8) |  | / | ? | O | _ | o | ← |  |  | / | ? | O | _ | o | ← |

ROM CG UNIT — RAM CG REGISTRATION UNIT

FIG. 6

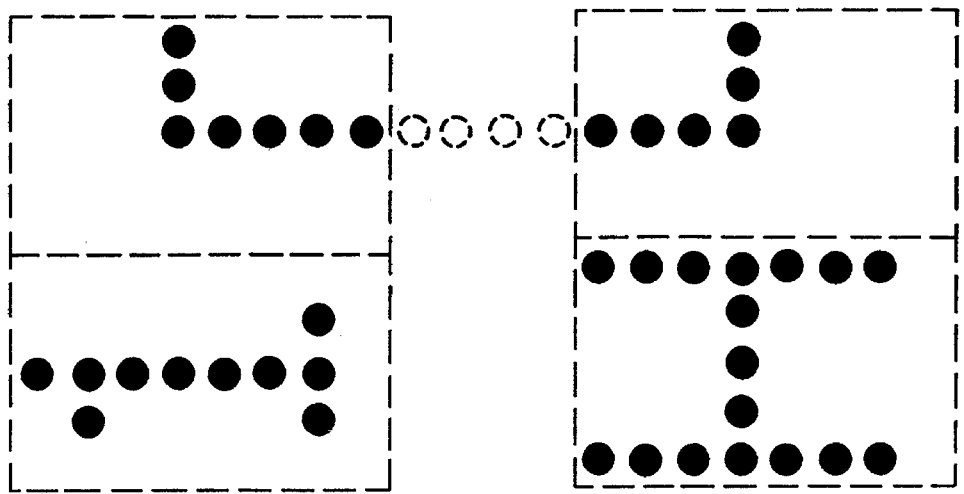
F I G. 10(B)
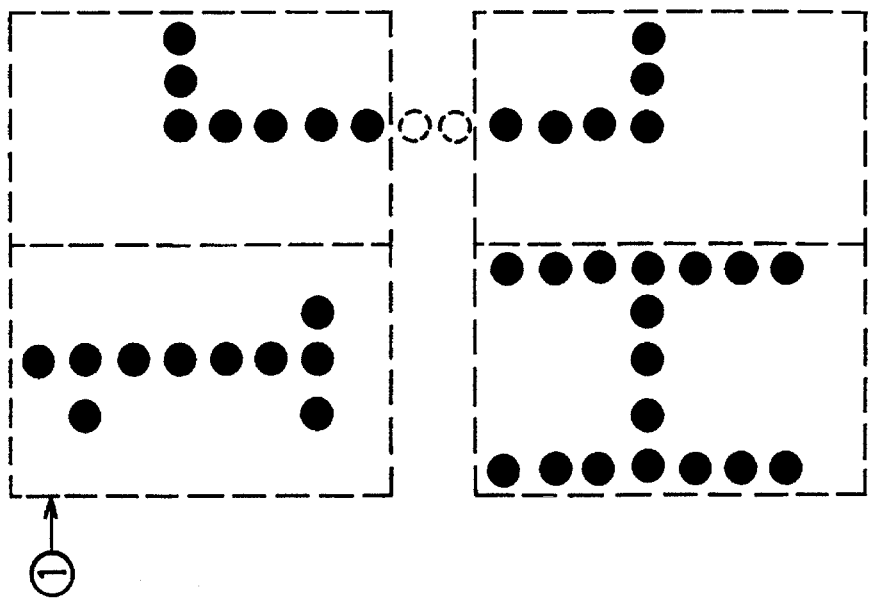
F I G. 10(A)

FACSIMILE APPARATUS WHICH CAN AVOID UNWANTED INTERLINE BREAKS IN OUTPUT

This application is a continuation of application Ser. No. 08/113,314, filed Aug. 30, 1993, now abandoned, which was a continuation of application Ser. No. 07/820,023, filed Jan. 13, 1992, now abandoned, which was a continuation of application Ser. No. 07/430,175, filed Nov. 1, 19989, abandoned.

BACKGROUND OF THE INVENTION

1. Field of the Invention

The present invention relates to a facsimile apparatus which can be connected to a data processing apparatus for transmitting/receiving a digital signal.

2. Description of the Prior Art

When a conventional facsimile apparatus of this type receives code data, e.g., ASCII code data from a data processing apparatus such as a personal computer, and converts it into corresponding pattern data to output the converted data (to perform print-out or facsimile transmission of the converted data), a blank region is formed between adjacent lines.

More specifically, in print-out, no printing is performed in a space between lines, while the recording paper sheet is fed by a predetermined pitch between lines, leaving a blank space between each two consecutive lines of printing.

In some facsimile apparatuses, when a special pattern which overlaps two or more lines and in which no space is to be formed between lines to be output and a specific line pitch is selected, the pattern is developed so that the patterns in the upper and lower lines are continuously output. When a line pitch is increased, however, such an apparatus cannot cope with this, and a space is formed between lines.

For example, when a line interval is set to be 6 lines/inch, a result like the print sample below is obtained, and double ruled lines are continuously output;

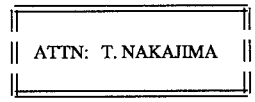

In contrast to this, when the same pattern is output with 3 lines/inch, the vertical double ruled lines are broken, and the desired result cannot be obtained;

Print-out control in a conventional facsimile apparatus of this type will be described below with reference to a control flow chart of FIG. 9.

The facsimile apparatus (step S1) receives ASCII code data to be output and a print instruction from a connected data processing apparatus. In step S2, ASCII code data for one array of the received data is read out. In step S3, the read out code data is converted to corresponding pattern data, and is developed into a pattern. FIG. 10(A) shows a developed pattern corresponding to the code data. FIG. 10(A) exemplifies a case wherein the first array includes a "1" code and a "⌐" code, and the second array includes an "H" code and a "⌐" code.

In step S4, a pattern for one dot line is printed out. In FIG. 10(A), a first dot line indicated by ① is printed, and a recording sheet is fed by one dot.

It is then checked in step S5 if print-out operation for one array has been completed. If NO in step S5, the flow returns to step S4, and the next dot line is printed. In this manner, a print-operation in units of dot lines is continued in step S4. When a dot pattern for one array is completed, the flow advances from step S5 to step S6.

It is checked in step S6 if the print-out of all the code data sent from the data processing apparatus has been completed. If YES in step S6, the print-out operation is ended.

However, if NO in step S6, that is, if the print-out operation is not yet completed, and the code data for the next array remains, the flow advances to step S7, the recording sheet is fed by a line pitch designated by the data processing apparatus without a print-out operation within a line interval. The flow then returns to step S2, and the print-out operation of the next line is performed.

In FIG. 10(A), the line pitch corresponds to 2 dot lines. As can be seen from this print sample, the "⌐" code in the first array and the "⌐" code in the second array must be continuously printed as a vertical line. However, as shown in FIG. 10(A), a discontinuous line is formed. When the line pitch is large, for example, when the line pitch corresponds to 4 dots, as shown in FIG. 10(B), a still poorer print-out is obtained.

In a conventional facsimile apparatus which can be connected to a data processing apparatus such as a personal computer for transmitting/receiving a digital signal, all the font patterns and code data (ASCII code and the like) are sent from the connected data processing apparatus to the facsimile apparatus prior to the print-out operation every time the print-out operation is performed.

The received data is converted into corresponding pattern data, and is then printed out or is transmitted to another facsimile apparatus.

(1) For this reason, in the prior art, a pattern corresponding to certain code data is uniquely determined for a single output unit.

Therefore, a font of a character cannot be changed in units of lines.

(2) Such a changing of the font in units of lines is necessary since the size or font of characters is often changed only in special lines such as a title portion or a signature portion of a document in European countries and the U.S.A.

SUMMARY OF THE INVENTION

The present invention has been made to solve the above-mentioned problems.

It is therefore an object of the present invention to provide a facsimile apparatus which can output patterns corresponding to specific codes as a continuous pattern regardless of a line pitch, and can continuously output special characters such as a vertical line without disconnection in the vertical direction regardless of a line pitch.

It is another object of the present invention to provide a facsimile apparatus with which an arbitrary pattern can be registered from a data processing apparatus in the facsimile apparatus in correspondence with a desired code, and the arbitrary pattern can be output during, e.g., an output operation of one page in addition to a pattern corresponding to the predetermined registered code.

As a means for achieving the above objects, the present invention comprises the following arrangement.

More specifically, there is provided a facsimile apparatus which comprises interface means for interfacing with a data processing apparatus for transmitting/receiving a digital signal, a pattern storage unit for storing pattern data corresponding to code data sent from the data processing apparatus, and pattern conversion means for converting the code data sent from the connected data processing apparatus using the pattern storage unit into corresponding pattern data, and outputting the converted pattern data, comprising detection means for detecting specific code data in the code data sent from the data processing apparatus, and interlinearly connecting means for connecting, when the detection means detects the specific code data, pattern data in upper and lower lines to connect output patterns corresponding to the specific code data without forming a space between lines.

There is also provided a facsimile apparatus which can be connected to a data processing apparatus for transmitting/receiving a digital signal, comprising a registration pattern storage unit for storing code data and corresponding pattern data in correspondence with each other, an external pattern storage unit for storing pattern data and code data sent from the connected data processing apparatus in correspondence with each other, and an output unit for converting the code data sent from the connected data processing apparatus into corresponding pattern data using the registration pattern storage unit and the external pattern storage unit and outputting the converted pattern data.

Other features and advantages of the present invention will be apparent from the following detailed description of the preferred embodiments, taken in conjunction with the accompanying drawings, in which like reference characters designate the same or similar parts throughout the figures thereof.

BRIEF DESCRIPTION OF THE DRAWINGS

FIG. 2 shows a font map of the first embodiment;

FIG. 6 shows a font map of the second embodiment;

FIGS. 10(A) and 10(B) are views showing conventional developed patterns.

DETAILED DESCRIPTION OF THE PREFERRED EMBODIMENTS

An embodiment of the present invention will now be described with reference to the accompanying drawings.

(First Embodiment)

Figure 1:
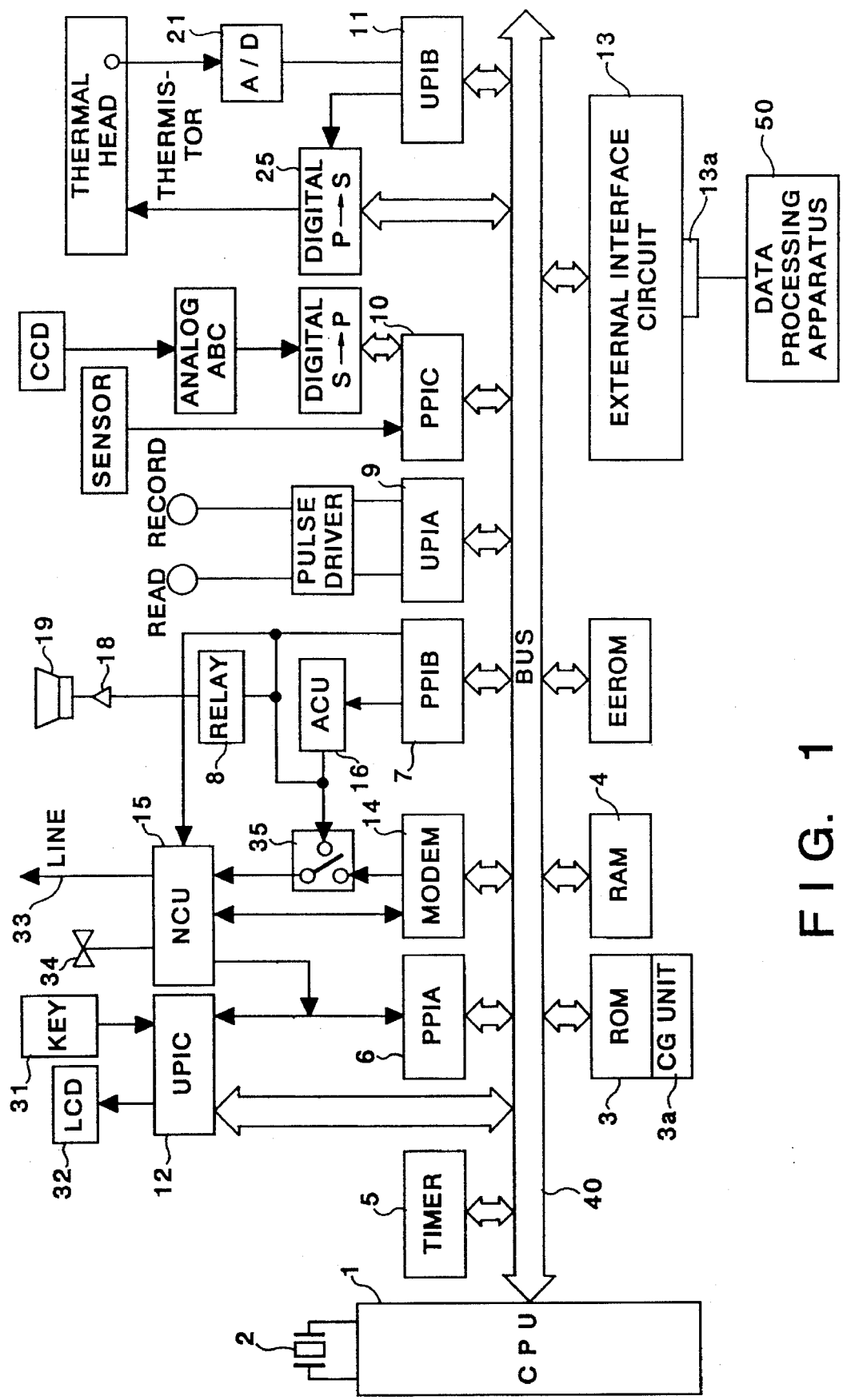
FIG. 1 is a block diagram of a facsimile apparatus according to the first embodiment of the present invention.

FIG. 1 is a block diagram showing the overall arrangement of a facsimile apparatus according to the first embodiment of the present invention.

Figure 3:
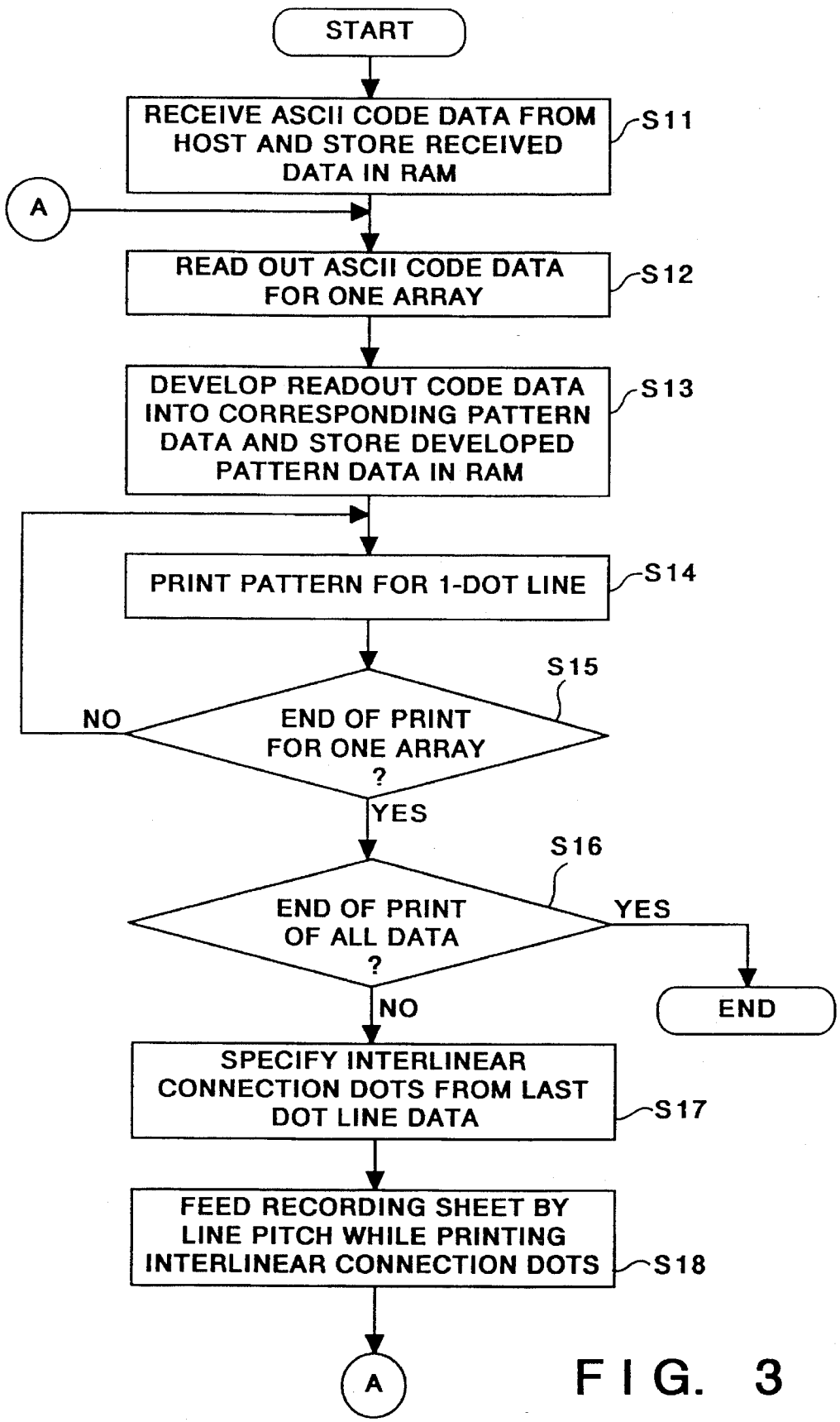
FIG. 3 is a control flow chart of the first embodiment.

Referring to FIG. 1, reference numeral 1 denotes a central processing unit (CPU) for executing control of the overall arrangement of this embodiment in accordance with a program shown in FIG. 3 stored in a ROM 3. The CPU 1 is connected to a quartz oscillator 2 for generating a fundamental clock signal.

The CPU 1 is connected to the following units through a bus 40 suitable for transmitting a data signal, address signal, control signal, and the like.

More specifically, the CPU 1 is connected to the ROM 3, a RAM 4, a timer 5 for measuring various times, PPIs (Programmable Parallel I/Os) A, B, and C (6, 7, and 10), and UPIs (peripheral CPUs) A, B, and C (9, 11, and 12) through the bus 40.

The PPIA 6 is connected to the UPIC 12 for controlling a keyboard (KEY) 31 and a liquid crystal display (LCD) 32, and to a network control unit (NCU) 15 for controlling a public communication line (line) 33 and a telephone set 34. The PPIB 7 is connected to an automatic calling unit (ACU) 16 for sending a telephone number signal onto the line 33 in accordance with destination telephone number data output from the CPU 1, and to the NCU 15. The PPIC 10 is connected to an original reading unit and a sensor for detecting if an original has been placed on or in the unit for reading. The original reading unit is constituted by a CCD for reading an original surface, an analog ADC for converting analog data from the CCD into digital data, and a digital SP for converting serial data from the analog ADC into parallel data matching with a processing format in the CPU 1. The UPIA 9 performs drive control of an original and a recording sheet. The UPIB 11 controls a recording system of a thermal head through a parallel-to-serial (P/S) converter 25 for performing thermal control and an A/D converter 21 for thermal density control.

Reference numeral 13 denotes an external interface circuit for interfacing with a data processing apparatus 50 connected through a connector 13a. In this embodiment, the circuit 13 comprises a serial interface circuit complying with RS232C standards. The specifications of the interface circuit may be determined in correspondence with interface specifications of a data processing apparatus to be connected. Reference numeral 14 denotes a modem for performing modulation/demodulation processing of image data and transmission/reception of a facsimile communication data signal; 18, a loudspeaker driver; and 19, a loudspeaker. The loudspeaker 19 acoustically outputs a signal from the line 33 upon an ON operation of a relay 8. A codec can be provided for coding transmission data from the PPIC 10 to transmit it to another apparatus through the modem 14 and encoding reception data sent from the modem 14.

Figure 2:
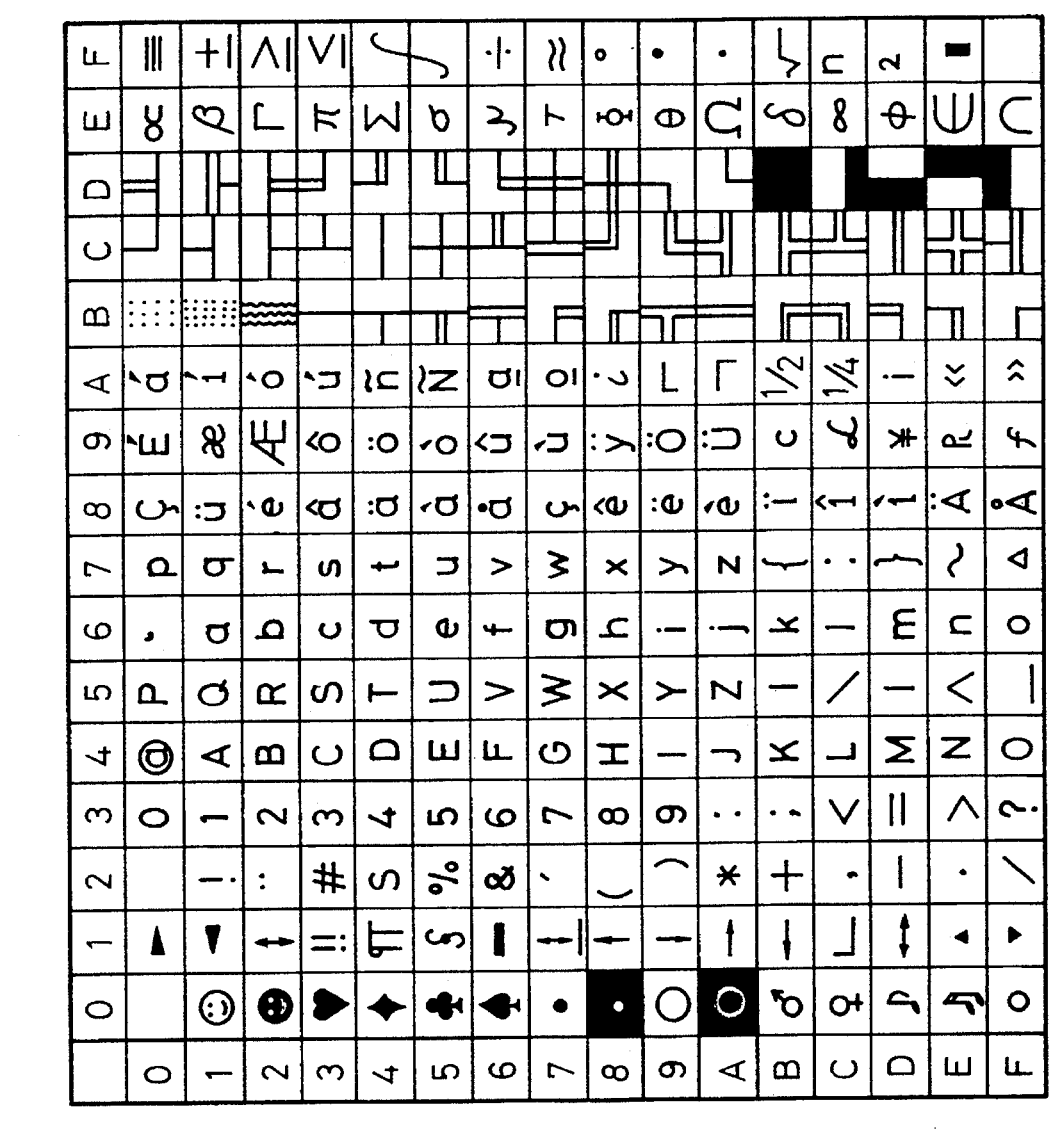

In this embodiment, the ROM 3 includes a character generator unit (CG unit) 3a for storing character patterns shown in FIG. 2. This embodiment employs graphic characters for the IBM PC of ASCII codes, as shown in FIG. 2.

Control of this embodiment with the above arrangement will be described below with reference to the flow chart shown in FIG. 3.

Figure 9:
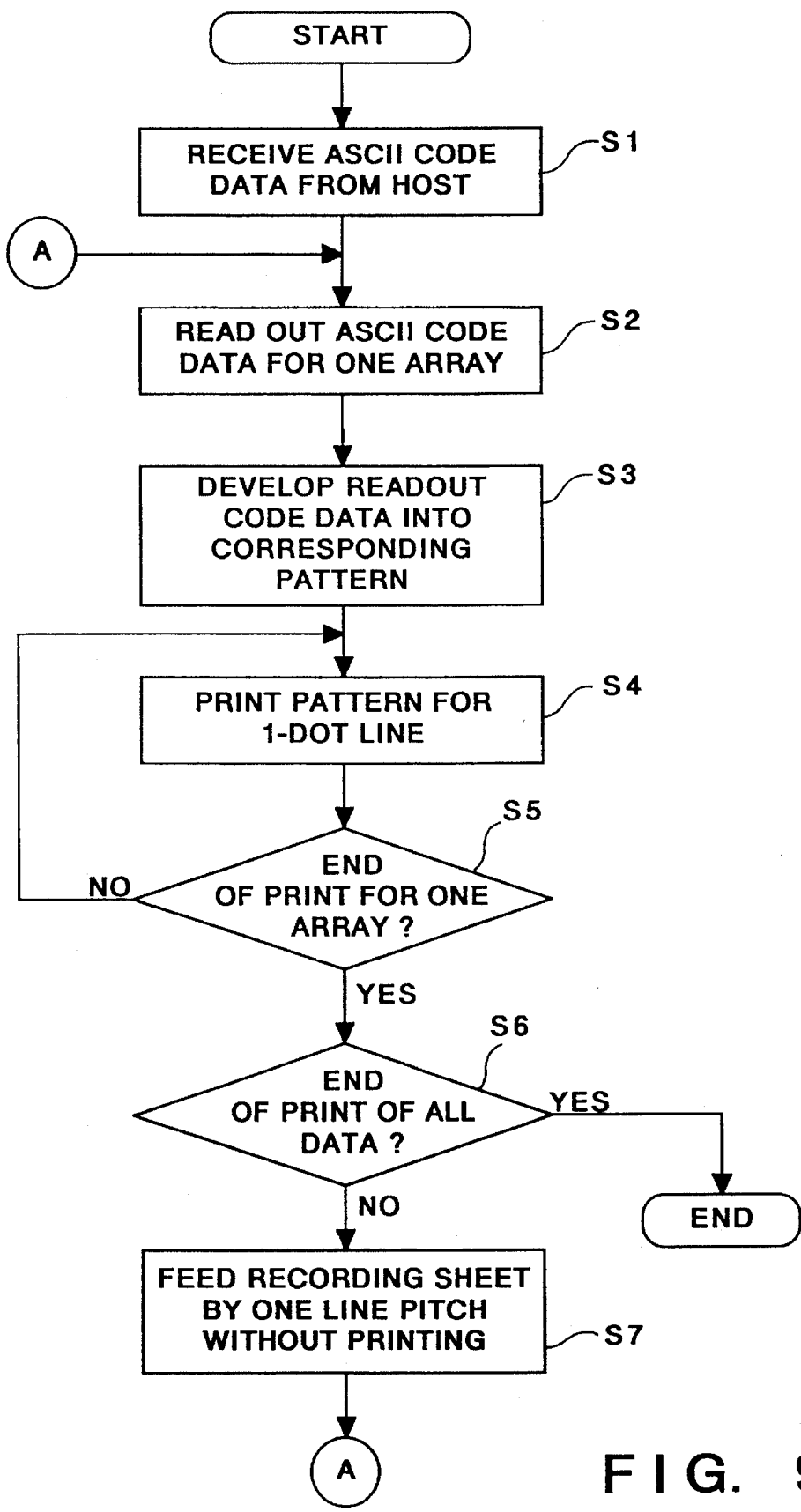
FIG. 9 is a flow chart showing conventional pattern development control.

A major difference between the processing shown in FIG. 3 and that of the prior art shown in FIG. 9 is that in this embodiment, when code data with which a vertical line is to be continuously printed are printed out, patterns corresponding to the code data can be automatically connected.

In step S11, the CPU 1 receives text data (character code data and the like) to be printed out and a print instruction from the connected data processing apparatus 50 through the connector 13a, the external interface circuit 13, and the bus 40, and sequentially stores the code data in a text area in the RAM 4.

In step S12, the CPU 1 reads code data for one array of non-printed data from the text area of the RAM 4. In step S13, the CPU 1 sends the read-out code data to the CG unit 3a in the ROM 3 to covert them into a corresponding dot image pattern, so that the pattern is developed in the RAM 4. In step S14, the first line of the dot image pattern developed in the RAM 4 is printed out. More specifically, dot image pattern data for one line is printed on a recording sheet by the thermal head by controlling the UPIB 11, the A/D converter 21, and the digital P/S converter 25. In this case, a paper feed motor of a printer is driven by the UPIA 9 to feed the recording sheet by one dot pitch. In step S15, it is checked if the print-out operation of the dot image pattern for one array is complete, in the same manner as in step S5 in FIG. 9. If NO in step S15, the flow returns to step S14; otherwise, the flow advances to step S16.

It is checked in step S16 if all the text data in the text area of the RAM 4 are printed (this checking operation is performed by counting the text data in the RAM 4 by the CPU 1). If YES in step S16, the print-out processing is ended.

However, if NO in step S16, the flow advances to step S17, and line pitch printing processing unique to this embodiment is performed. In step S17, dot image pattern data for the last printing dot line is checked to determine if there are interlinear connection dots for which line connection is necessary.

In order to check if there are interlinear connection dots, various methods may be employed. For example, all the code data to be continuously printed are registered in advance, and when the corresponding code data is printed out, this checking operation is performed.

This embodiment can employ this method. However, this embodiment employs the following method as an easier method. That is, in a dot pattern which does not include interlinear connection dots, the last line does not include a dot pattern to be printed. By utilizing this fact, when a dot to be printed is present in the last line, this dot is determined as an interlinear connection dot.

When interlinear connection dots are specified by this method, the flow advances to step S18, and dots are printed continuously with the interlinear connection dots specified in step S17 by a necessary line pitch while feeding the recording sheet.

Note that the line pitch is input together with the print instruction from the data processing apparatus 50 through the external interface circuit 13, and is stored in the RAM 4.

In this manner, when a vertical line is to be drawn without forming a space between lines, it can be drawn automatically. In this case, the line pitch is not adversely influenced, and a continuous vertical line can be drawn even if the line pitch is large.

In order to specify interlinear connection dots, no interlinear printing operation is performed for normal characters such as English letters, and only symbols may be determined as objects to be specified.

Figure 4B:
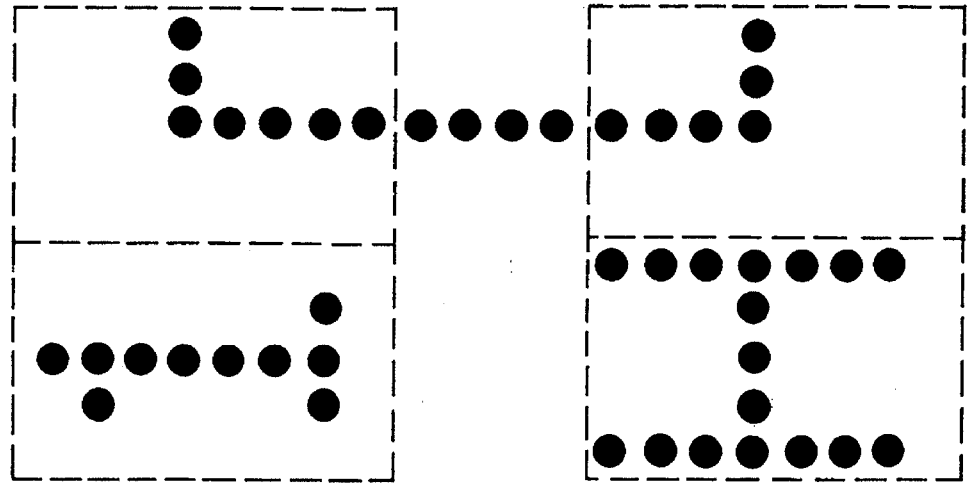
FIGS. 4(A) and 4(B) are views showing developed patterns of the first embodiment.
Figure 4A:
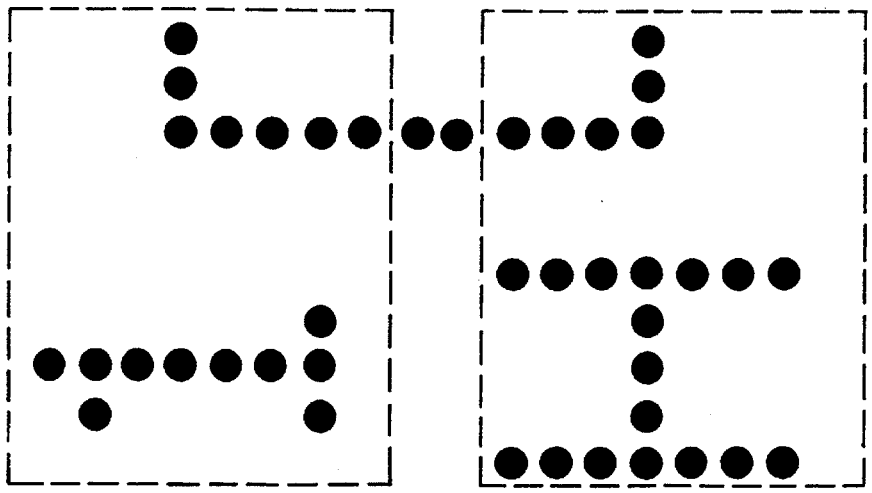

FIGS. 4(A) and 4(B) show print-out samples of this embodiment.

FIG. 4(A) shows a case wherein the same code data as in FIG. 10(A) is printed out with the same line pitch, and FIG. 4(B) shows a case wherein the same code data as in FIG. 10(B) is printed out with the same line pitch.

Continuous vertical line patterns shown in FIG. 2 include "l" indicated by hexadecimal (to be referred to as "#" hereinafter) "B3", "-" indicated by "#B4", and the like. Of course, "■" indicated by "#DB" is also included.

The print-out operation of code data has been exemplified. After data from the data processing apparatus 50 are developed into corresponding pattern data, the developed pattern data may be transmitted to another facsimile apparatus.

In this case, after transmission data is received in step S11, destination calling processing is executed. More specifically, the relay 8 is controlled through the PPIB 7, and a switch 35 is switched to the ACU 16 side. At the same time, a DC loop is formed in the line. After a dial tone from an exchanger of an office is detected, destination telephone number data designated by the CPU 1 is sent to the ACU 16, and a telephone number signal corresponding to the telephone number data is sent onto the line. Thereafter, the switch 35 is connected to the modem 14 side, and the NCU 15 monitors if the polarity of the line 33 is inverted so as to check if the destination apparatus responds. When a response from the destination is detected, synchronization between two apparatuses is taken in accordance with a communication control procedure capable of performing communication according to the known CCITT recommendation T4 standard.

When connection with the destination is completed, the CPU 1 executes processing in step S12 to step S18. In this case, in place of the print-out operation upon output of the developed pattern to the UPIB 11, the developed pattern is sent to the modem 14. The modem 14 modulates the sent transmission data, and transmits the modulated data to the connected destination apparatus through the NCU 15 and the line 33 at a predetermined transmission rate. When transmission of all the text data in the text area of the RAM 4 is completed, the DC loop of the connected line is opened to recover the line.

In the above description, dot pattern data corresponding to code data is permanently held in the ROM 3 of the facsimile apparatus as the CG unit 3a. The dot pattern data corresponding to the code data may be transferred from the connected data processing apparatus 50 before it is output.

Thus, print-out or facsimile transmission of an arbitrary font pattern from the data processing apparatus 50 can be performed as compared to a case wherein only single font pattern can be output when dot pattern data corresponding to code data is permanently stored in the facsimile apparatus.

According to the present invention, as described above, when patterns must be vertically continuously output at a variable line pitch using minimum font data, they can be realiably output as a vertically continuous pattern.

(Second Embodiment)

In the above description, a case has been exemplified wherein when a special pattern in which a space is not formed between lines is to be output, and when a specific line pitch is selected, a pattern is developed so that the patterns in the upper and lower lines are output so as to be continuous with each other where appropriate. In a facsimile apparatus which can be connected to a data processing apparatus for transmitting/receiving a digital signal, various font characters are often mixed.

The second embodiment of the present invention has been made in consideration of the following:

① In European countries and the U.S.A., a small number of symbols are used in addition to English letters and numerals. They correspond to only "#00" to "#7F" in ASCII codes, and codes "#80" to "#FF" are not used as codes.

② When the RS232C standard often used in data communication is employed, 8-bit data is normally used as one unit (data block) of communication. When such a communication method is employed, "#00" (0000 0000) to "#FF" (1111 1111) can be expressed.

Thus, the second embodiment of the present invention uses codes "#80" to "#FF", and is arranged so that these codes and corresponding font pattern data can be registered from a data processing apparatus (e.g., a personal computer) connected to the facsimile apparatus of this embodiment.

In the facsimile apparatus of this embodiment, font patterns corresponding to normal codes "#00" to "#7F" are registered in the apparatus in advance, and codes "#80" to "#FF" are desirably registered and output at the data processing apparatus side.

The second embodiment of the present invention will be described in detail below with reference to FIGS. 5 to 8.

Figure 5:
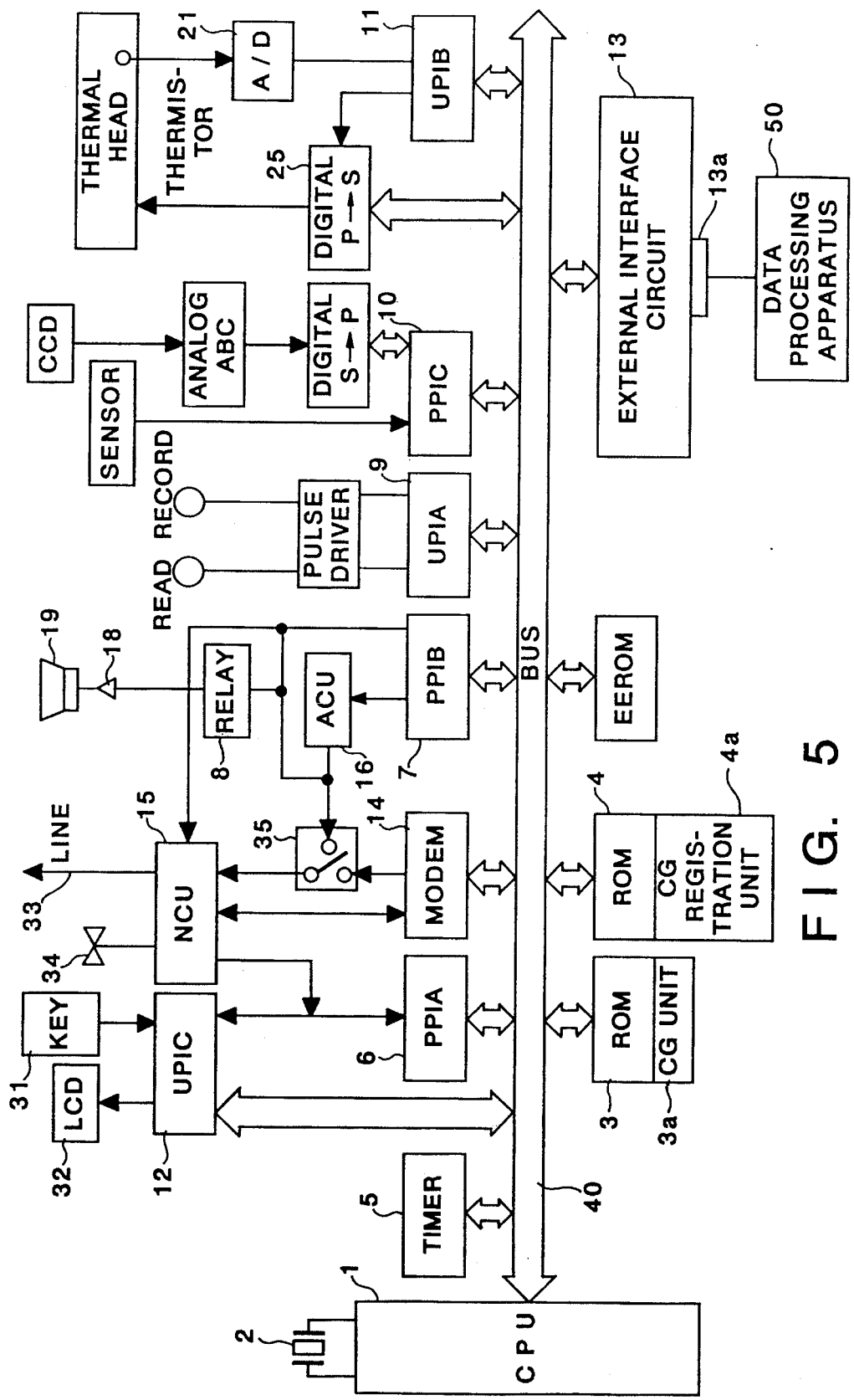
FIG. 5 is a block diagram of a facsimile apparatus according to the second embodiment of the present invention.

FIG. 5 is a block diagram showing the overall arrangement of the facsimile apparatus of the second embodiment. The same reference numerals in FIG. 5 denote the same parts as in FIG. 1, and a detailed description thereof will be omitted.

In FIG. 5, a difference from FIG. 1 is as follows.

Figure 8A:
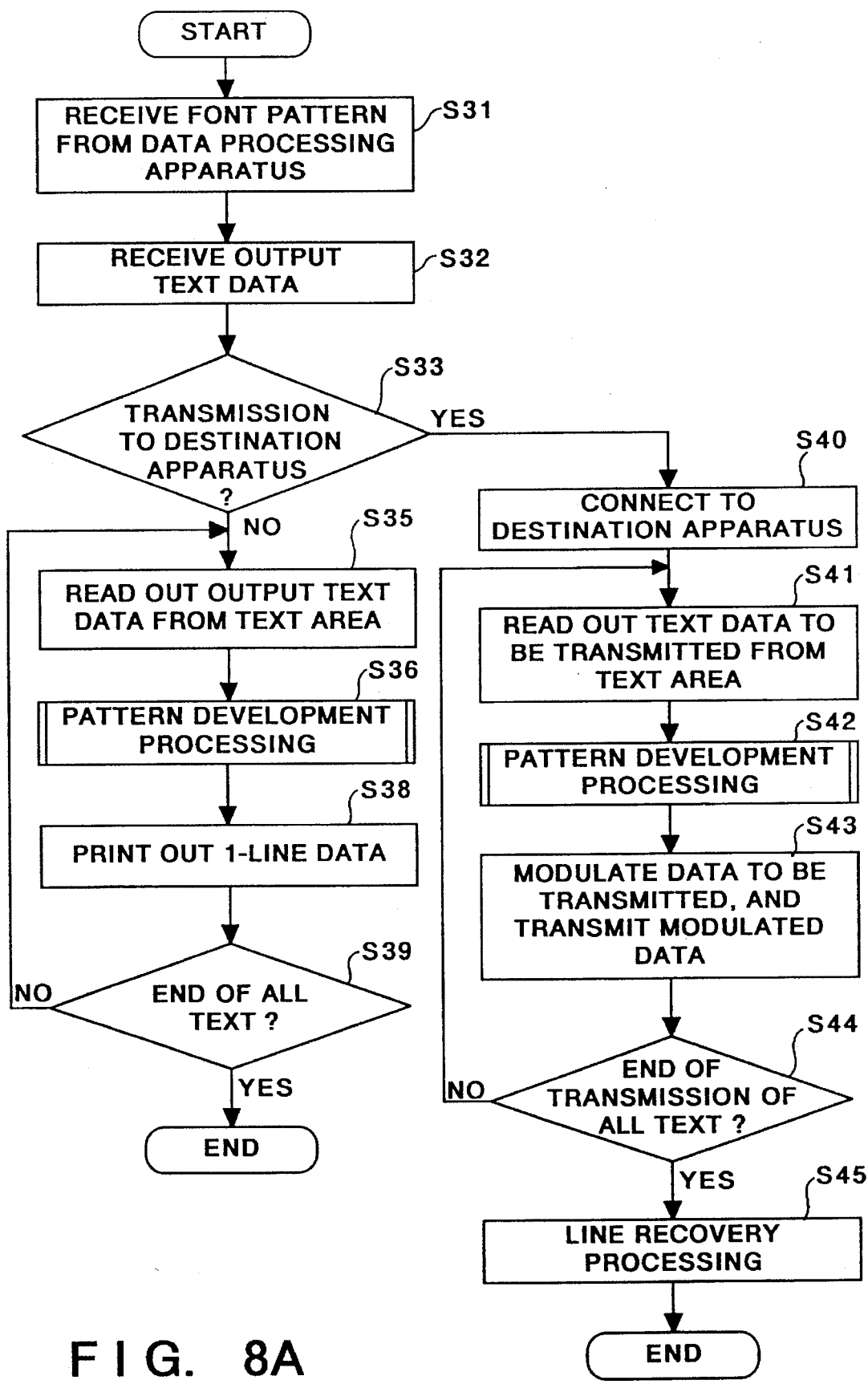
FIGS. 8A and 8B are control flow charts of the second embodiment.
Figure 8B:
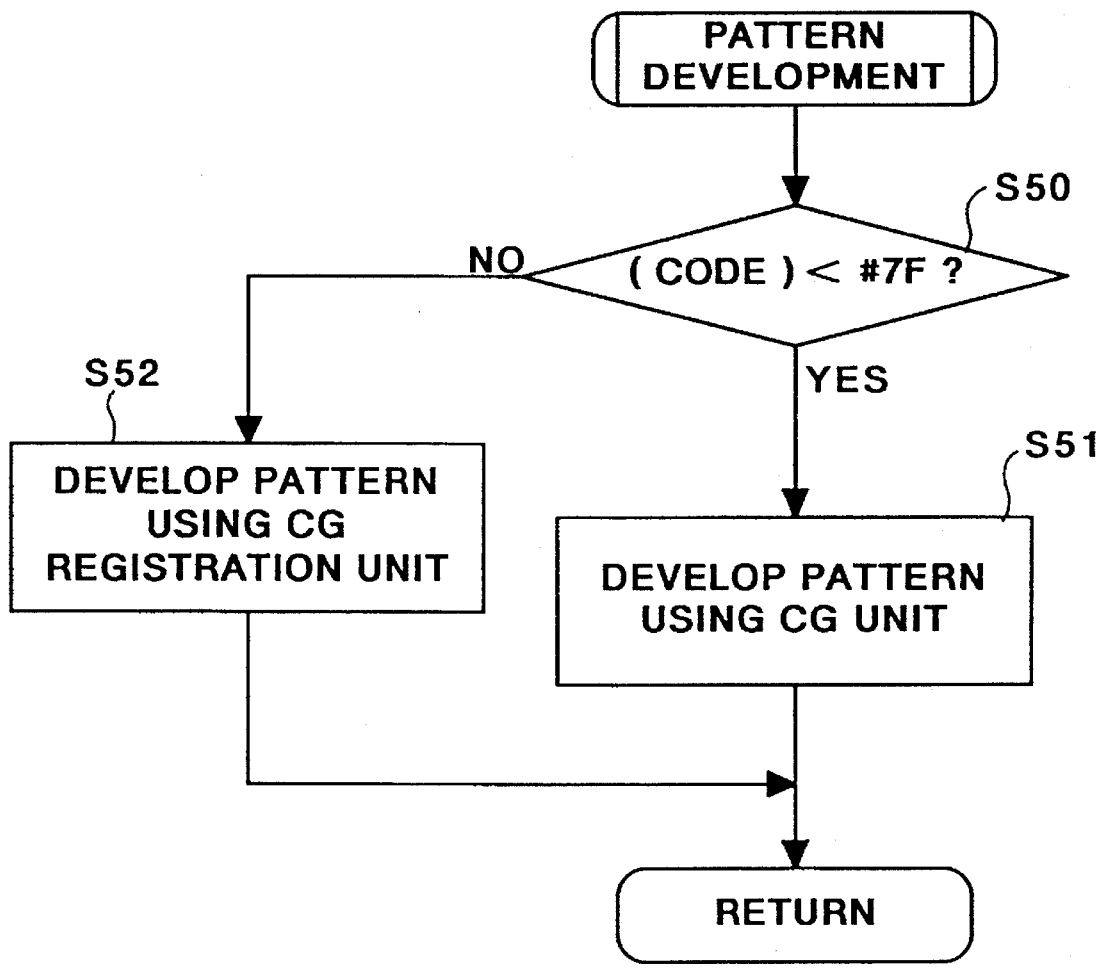

That is, the control procedure stored in a ROM 3 is replaced with one shown in FIGS. 8A and 8B.

Character patterns registered in a CG unit 3a of the ROM 3 are alphanumerical characters corresponding to ASCII codes "#00" to "#7F" as indicated by the "CG unit" in FIG. 6.

A CG registration unit 4a as a registration unit of arbitrary character patterns sent from a data processing apparatus 50 is allocated in a RAM 4. Pattern data of ASCII codes "#80" to "#FF" different from those in the CG unit 3a in the ROM 3 are written and registered in the CG registration unit 4a.

Control of the second embodiment with the above arrangement will be described below.

Figure 7:
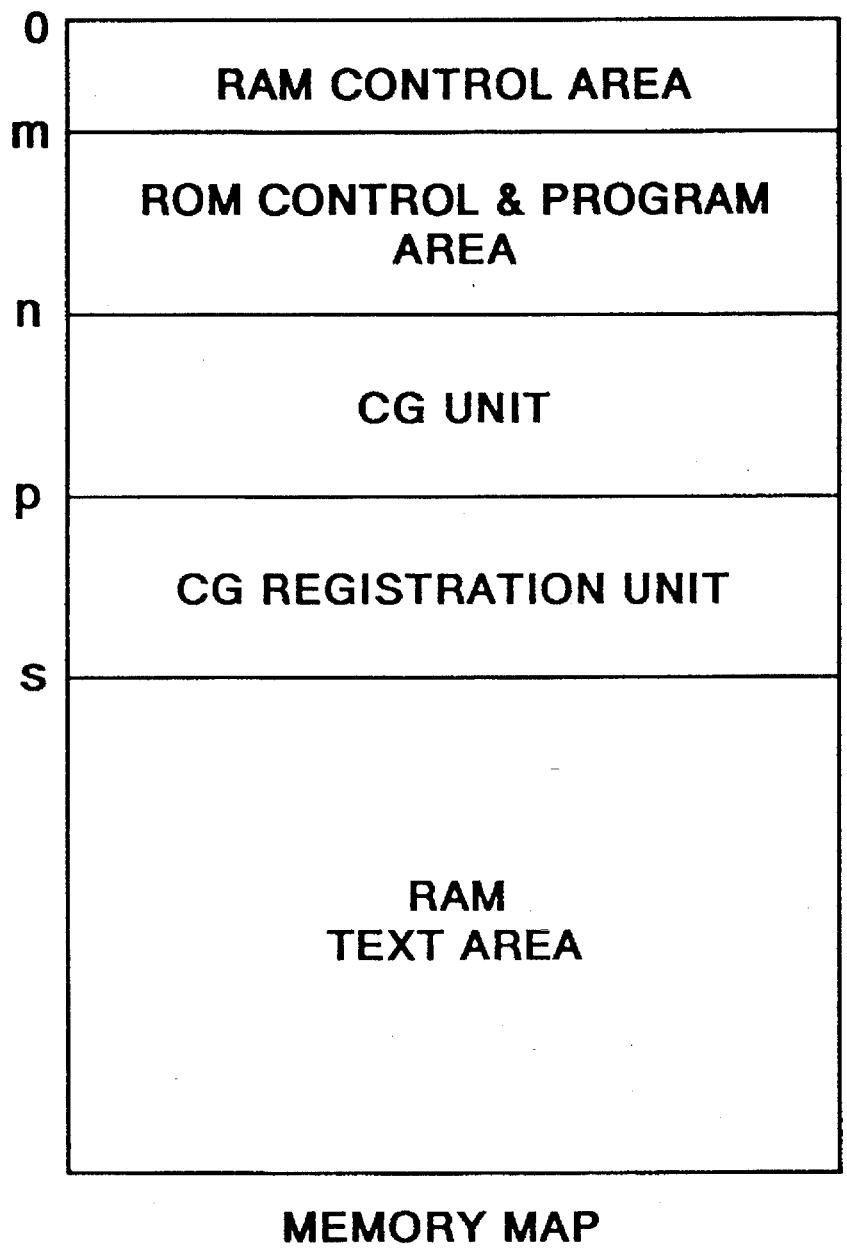
FIG. 7 shows a memory map of the second embodiment.

A memory map of the CPU 1 as a combination of the ROM 3 and the RAM 4 in this embodiment is assigned, as shown in FIG. 7.

An area defined by memory addresses "0" to "m" is used by a control program in the RAM 4, and areas used for a status area, areas used for storing various intermediate calculation results, and the like are assigned thereto. The following addresses "m" to "n" define a storage area of a control program for the ROM 3 partially shown in FIGS. 8A and 8B, addresses "n" to "p" define an area for the CG unit 3a of the ROM 3, and addresses "p" to "s" define an area for the CG registration unit 4a of the RAM 4. After the address "s", a text area for storing transmission/reception document data, read data, print data, and the like for the RAM 4 is allocated.

When the power switch of the apparatus of this embodiment with the above-mentioned memory map is turned on, the control program is executed from the address "m" of the ROM 3. In this case, known facsimile processing, e.g., processing for outputting data received from a line 33 using a connected printer, processing for transmitting original data read by a reader to a desired destination facsimile apparatus, and the like, processing for printing out image data from the data processing apparatus 50, processing for outputting image data read by the reader to the data processing apparatus 50, and the like are not special processing operations but known processing operations, and a detailed description thereof will be omitted.

Processing for converting code data from the connected data processing apparatus 50 into corresponding pattern data and outputting the pattern data as the characteristic feature of this embodiment will be described below with reference to the flow charts shown in FIGS. 8A and 8B.

In this case, the CPU 1 executes the processing shown in the flow chart of FIG. 8A first.

In step S31, code data to be registered from the connected data processing apparatus 50 to the CG registration unit 4a of the RAM 4, and corresponding pattern data are received through a connector 13a, an external interface circuit 13, and a bus 40, and are developed in corresponding areas in the CG registration unit 4a, as shown in FIG. 6. The processing in step S31 is executed as needed. If a pattern already registered in the CG registration unit 4a is used as it is, the processing in step S31 may be omitted.

In step S32, text data (character code data, and the like) to be output which are sent from the data processing apparatus 50 through the same path are received, and are sequentially stored in the text area in the RAM 4. With this processing, all the data to be output are prepared in the apparatus of this embodiment. Output processing of stored data is then performed.

It is checked in step S33 if an instruction from the data processing apparatus indicates transfer processing to a destination facsimile apparatus through the line 33. If the instruction is not an output instruction to another facsimile apparatus but a print-out instruction from its own printer, the flow advances to step S35, and data for the first line of non-printed data are read out from the text area of the RAM 4. In step S36, pattern development processing is performed. That is, the code data is converted to a corresponding image pattern, and the pattern is output to a UPIB 11 to be printed out.

The pattern development processing will be described in detail below with reference to FIG. 8B.

It is checked in step S50 in FIG. 8B if the text code data to be output is "#7F" or less. When the text code data exceeds "#7F", the CG registration unit 4a of the RAM 4 is referred to develop the data into a pattern registered by the data processing apparatus 50. However, when the text code data is "#7F" or less, the CG unit 3a of the ROM 3 is referred to develop the data into a pattern.

When the text code data is "#7F" or less, the flow advances to step S51, and the text code data is converted to corresponding pattern data using the CG unit 3a of the ROM 3. The pattern data is then sent to the UPIB 11, thus ending processing.

When the text code data exceeds "#7F", the flow advances to step S52, and the text code data is converted to corresponding pattern data using the CG registration unit 4a of the RAM 4. The pattern data is then sent to the UPIB 11, thus ending processing.

With the above-mentioned pattern development processing, when pattern development of print data for one line is completed, the flow advances to processing in step S38 in FIG. 8A, and one-line pattern data is printed on a recording sheet by a thermal head by controlling the UPIB 11, an A/D converter 21, and a digital P/S converter 25, and the like. In this case, a UPIA 9 drives a paper feed motor of the printer to feed the recording sheet.

It is checked in step S39 if all the text data in the text area of the RAM 4 are printed (this checking operation is performed by counting text data in the RAM 4 by the CPU 1). If NO in step S39, the flow returns to step S35, and the above print-out processing repeated; otherwise, the print-out processing is ended.

If it is determined in step S33 that transmission processing to a destination facsimile apparatus is selected, the flow advances to step S40, and destination calling processing is executed. That is, a relay 8 is controlled through a PPIB 7, and a switch 35 is switched to an ACU 16 side. At the same time, a DC loop is formed in the line. After a dial tone from an exchanger of an office is detected, destination telephone number data designated by the CPU 1 is sent to the ACU 16, and a telephone number signal corresponding to the telephone number data is sent onto the line. Thereafter, the switch 35 is connected to a modem 14 side, and an NCU 15 monitors if the polarity of the line 33 is inverted so as to check if the destination apparatus responds. When a response from the destination is detected, synchronization between two apparatuses is taken in accordance with a communication control procedure capable of performing communication according to the known CCITT recommendation T4 standard.

When connection with the destination is completed, the flow advances to step S41, and the CPU 1 reads out the first output code of non-printed text data in the RAM 4 in the same manner as in step S35. In step S42, the CPU 1 executes the same pattern development processing shown in FIG. 8B as in step S36. In this case, the developed pattern is sent not to the UPIB 11 but to the modem 14. The modem 14 modulates the transmission data, and transmits the modulated data to the connected destination apparatus through the NCU 15 and the line 33 at a predetermined transmission rate. After transmission, the flow advances to step S44 to check if transmission of all the text data in the text area of the RAM 4 is completed. If YES in step S44, the DC loop of the line connected in step S40 is opened to recover the line.

If it is determined in step S44 that text data to be transmitted remain, the flow returns to step S41, and the above transmission processing is repeated.

According to this embodiment, as described above, font patterns normally used are prestored in the facsimile apparatus, and font patterns corresponding to codes different from those of the prestored font patterns are registered in the RAM 4 by the connected data processing apparatus 50 before the patterns are output. Thereafter, the corresponding codes need only be designated to convert the codes into the registered patterns, and the patterns can be output. Therefore, the number of patterns to be output by designating code data can be increased, and there is no practical limitation.

For this reason, different fonts or a special pattern such as a signature can be mixed in units of lines, and in units of characters.

As described above, according to the present invention, the data processing apparatus can register an arbitrary pattern in a facsimile apparatus in correspondence with a desired code, and an arbitrary pattern can be output during, e.g., output of one page in addition to a pattern corresponding to a registered code.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:

receiving means for receiving characters and symbol coded data;

a font memory for storing bit image patterns of characters and symbols;

converting means to convert the character and symbol coded data received by said receiving means into image data by reading the bit image patterns stored in said font memory in accordance with the character and symbol coded data;

inserting means to generate and insert supplemental data lines between character and symbol image lines converted by said converting means;

selecting means to select positions where upper and lower symbols on adjacent character and symbol lines are the same and where such symbols are predefined to indicate joining vertical lines;

adding means to add dots into supplemental data lines in positions where there are vertical lines in the symbols selected by said selecting means, in a case where the symbol coded data is determined as specific coded data which indicates lines;

storage means to store the image data generated by said converting means and the image data generated by said adding means; and outputting means to output the image data and supplemental data stored in said storage means.

2. The apparatus according to claim 1, wherein said receiving means also receives control signals to control the number of supplemental data lines inserted by inserting means.

3. The apparatus according to claim 1, wherein said adding means determines whether or not there is a dot in the last scan line of the character and symbol line and, if there is a dot in the character position determined by said selecting means, dots are inserted in successive vertical positions until the lower symbol position is encountered.

4. A facsimile apparatus comprising:

an interface circuit for receiving character and symbol coded data;

a font memory for storing bit image patterns of characters and symbols;

a converting unit to convert character and symbol coded data received by said interface circuit into image data by reading the bit image patterns stored in said font memory in accordance with the character and symbol coded data;

an inserting unit to generate and insert supplemental data lines between character and symbol image lines converted by said converting unit;

a selecting unit to select pixel positions where the upper and lower symbol coded data on adjacent character and symbol lines indicate existence of a vertical connecting line;

an adding unit to add dots into supplemental data lines where there are vertical lines in the symbol selected by said selecting unit, in a case where the symbol coded data is determined as specific coded data which indicates lines;

a storage unit to store the image data generated by said converting unit and the image data generated by said adding unit; and an outputting unit to output the image data and supplemental data stored in the storage unit.

5. The apparatus according to claim 4, wherein said interface circuit also receives control signals to control the number of supplemental data lines inserted by the inserting unit.

6. The apparatus according to claim 4, wherein the specific coded data is detected by determining whether or not dot patterns are included in an immediately preceding printing dot line of the coded data received by said interface circuit, and outputs continuous patterns by repeatedly recording the dot patterns in the immediately preceding printing dot line corresponding to the specific coded data repeatedly by recording means.

* * * * *

UNITED STATES PATENT AND TRADEMARK OFFICE
CERTIFICATE OF CORRECTION

PATENT NO. : 5,502,574
DATED : March 26, 1996
INVENTOR(S) : Toshifumi Nakajima

It is certified that error appears in the above-indentified patent and that said Letters Patent is hereby corrected as shown below:

In the Drawing:

SHEET 1

FIG. 1, "ABC" should read --ADC--.

COLUMN 1

Line 9, "Nov. 1, 19989," should read --Nov. 1, 1989,--.
    Line 40, "output;" should read --output:--
    Line 48, "obtained;" should read --obtained:--.
    Line 58, "(step S1)" should be deleted.
    Line 60, "apparatus." should read
          --apparatus (step S1).--.
    Line 61, "read" (second occurrence) should read
          --read---.

UNITED STATES PATENT AND TRADEMARK OFFICE
CERTIFICATE OF CORRECTION

PATENT NO.  : 5,502,574
DATED       : March 26, 1996
INVENTOR(S) : Toshifumi Nakajima It is certified that error appears in the above-indentified patent and that said Letters Patent is hereby corrected as shown below:

COLUMN 2

Line 4, "operation" should be deleted.

COLUMN 10

Line 25, "inserting" should read --said inserting--.

Signed and Sealed this

Twentieth Day of August, 1996

Attest:

BRUCE LEHMAN

Attesting Officer

Commissioner of Patents and Trademarks